United States Patent

[11] 3,545,556

[72] Inventors Herbert Tramposch
Riverside;
Henry Korth, Greenwich, Connecticut
[21] Appl. No. 821,836
[22] Filed May 5, 1969
[45] Patented Dec. 8, 1970
[73] Assignee Pitney-Bowes, Inc.
Stamford, Connecticut
a corporation of Delaware

[54] WEIGHT RANGE SCALE
11 Claims, 15 Drawing Figs.

[52] U.S. Cl. .................................................. 177/45,
177/206, 177/235, 177/204
[51] Int. Cl. ........................................... G01g 23/18,
G01g 1/28
[50] Field of Search ........................................... 177/45
—49, 235, 237, 203—206

[56] References Cited
UNITED STATES PATENTS
1,316,271  9/1919  Cameron...................... 177/235
1,475,930  12/1923  Cameron...................... 177/235
FOREIGN PATENTS
144,226  5/1920  Great Britain................ 177/175
270,768  12/1927  Great Britain................ 177/49
549,316  11/1942  Great Britain................ 177/204

*Primary Examiner*—Robert S. Ward, Jr.
*Attorneys*—William D. Soltow, Jr., Albert W. Scribner and Martin D. Wittstein ABSTRACT: A scale for classifying letters according to postal weight ranges, in which a single auxiliary weight is suspended from the weighing beam by means of a lost motion coupling on the same side of the fulcrum as the weighing pan, and is decoupled from the beam by an adjustable support in order to arrest the beam when the weight of a letter on the pan is within a postal range. There is also a sliding counterweight for use with letters falling into different postal ranges.

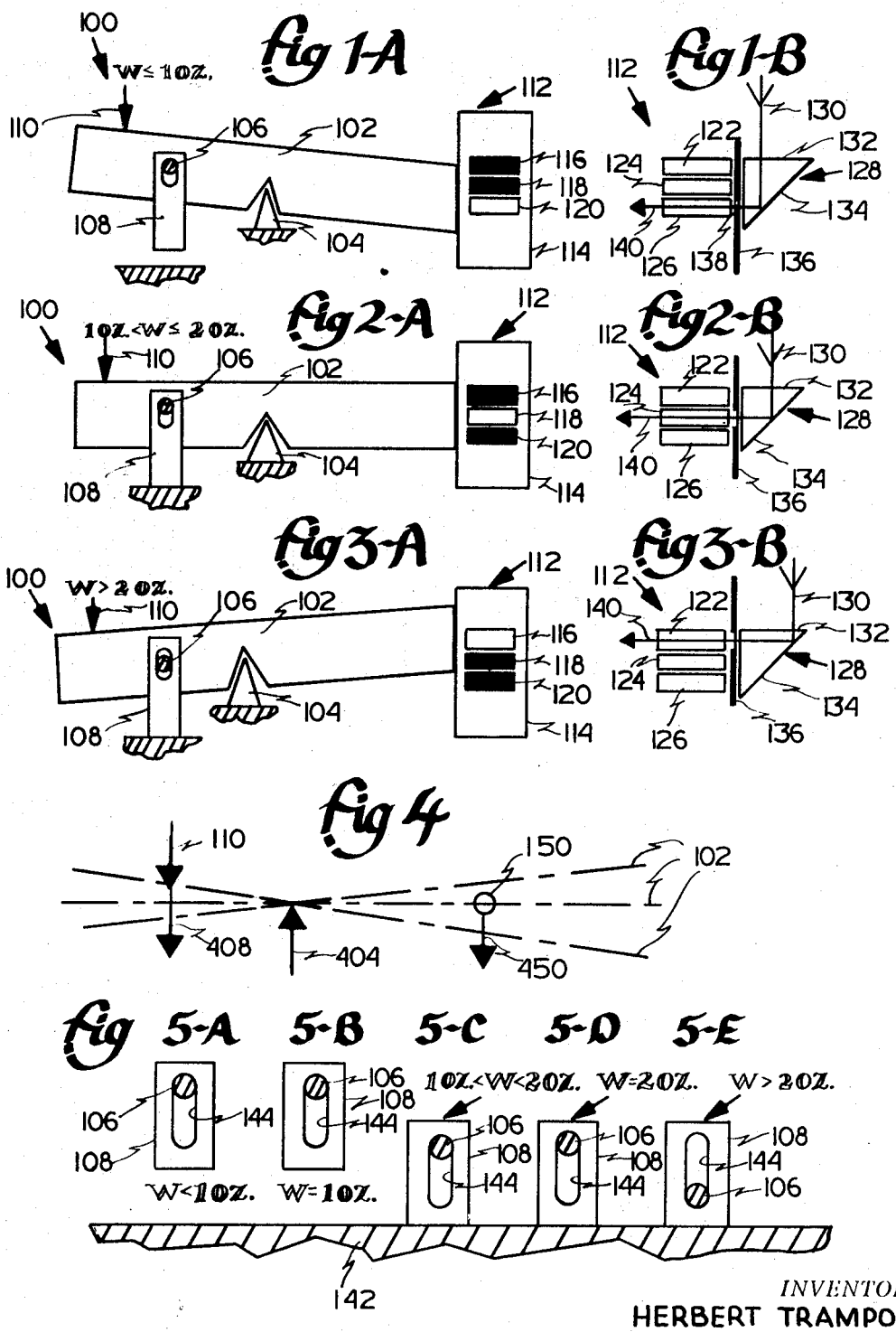

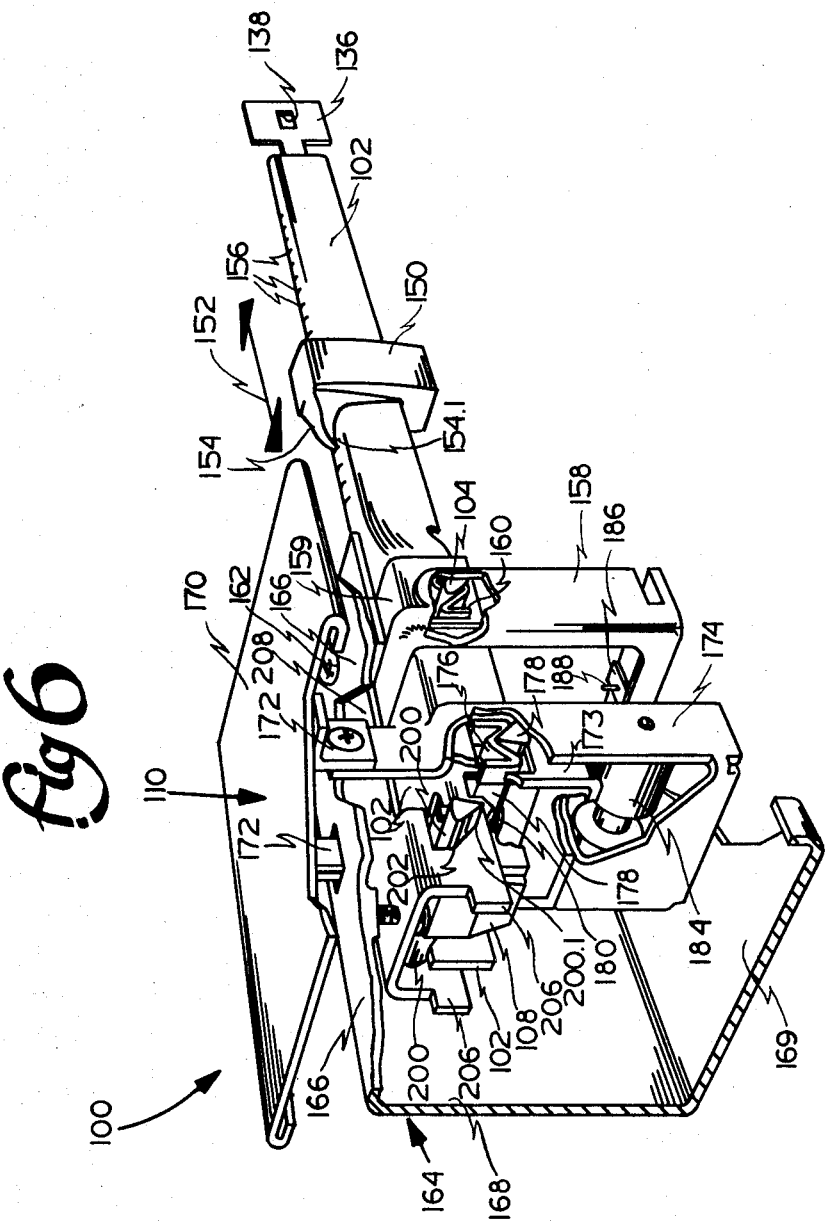

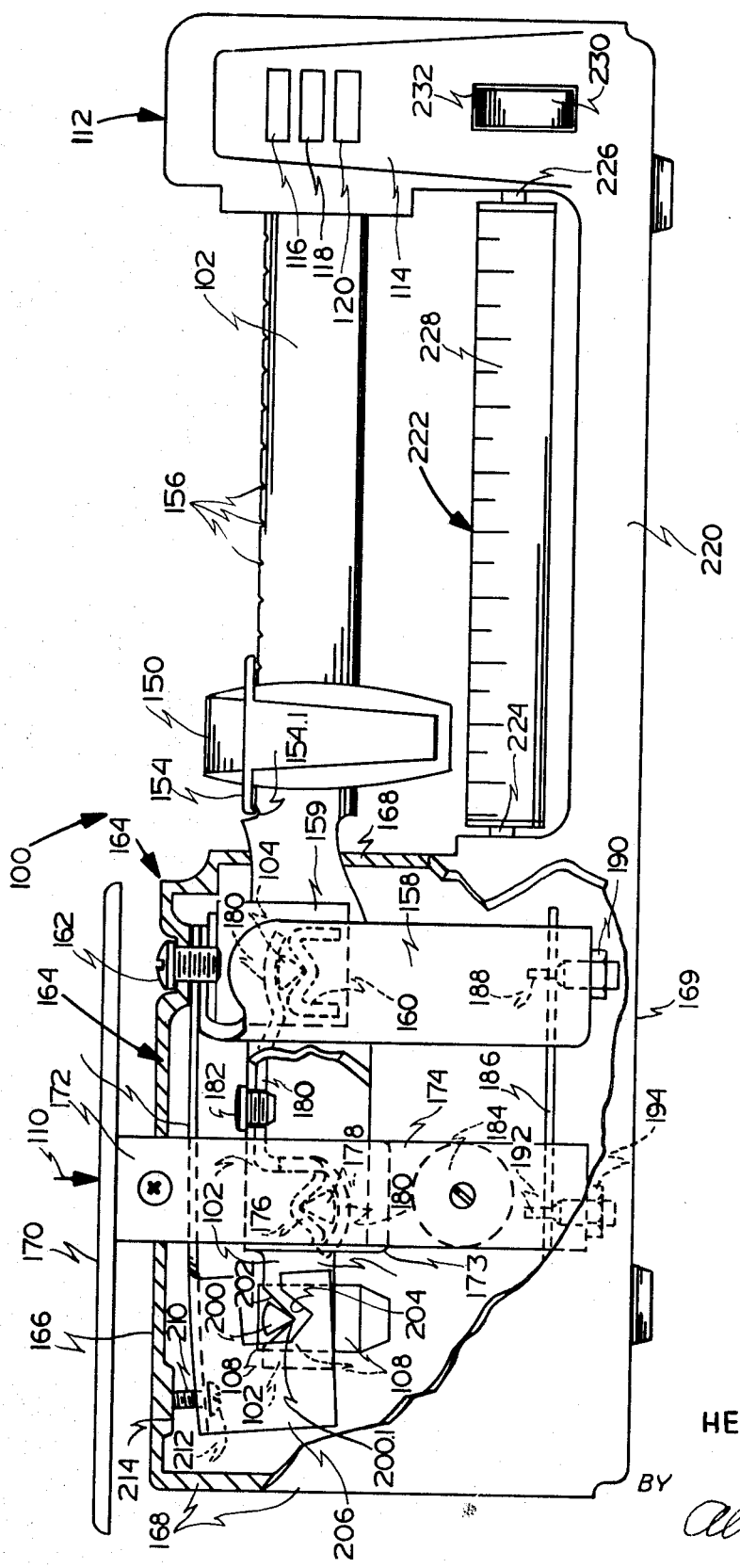

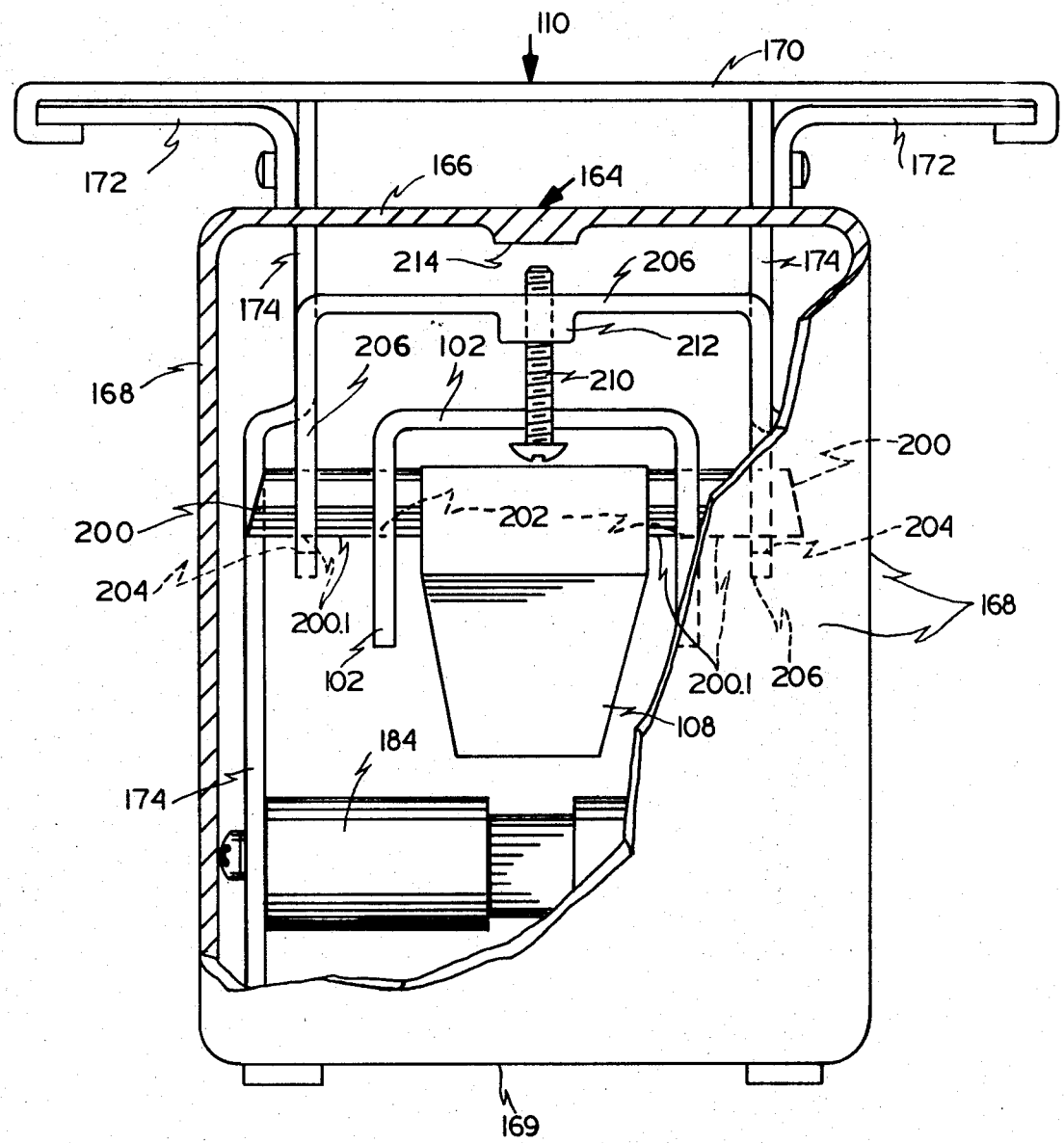

3,545,556

WEIGHT RANGE SCALE

FIELD OF THE INVENTION

This invention relates generally to instruments, and particularly concerns a scale which classifies objects according to weight ranges.

THE PRIOR ART

Weight range scales are old, and have been used for such purposes as classifying mail according to postage and classifying eggs according to price. However, the scales known to the prior art discriminated between weight ranges only by the use of a plurality of auxiliary weights. These weights were located on the opposite side of the weighing beam fulcrum from the object being weighed and were picked up successively by the weighing beam, an additional weight being picked up at each range switching point. Thus there had to be as many auxiliary weights as there were discrete weight ranges over which the scale could operate, and such a scale was not broadly useful unless it had a multiplicity of these weights.

THE INVENTION

The present invention improves on the prior art by providing a range scale which has but a single auxiliary weight. This scale performs the task of classification as to one weight range by suspending the auxiliary weight from the same side of the fulcrum as the weighed object, and dropping it off the beam, rather than picking it up, at the range switching points. Then by adding only one further part, a slidable counterweight on the opposite side of the fulcrum, the scale is enabled to perform this classifying function with regard to any one of a plurality of ranges, each corresponding to a different position of the counterweight.

BRIEF DESCRIPTION OF THE DRAWINGS

FIGS. 1A and 1B are schematic illustrations of a discrete weight range scale in accordance with this invention and a discrete readout therefor, illustrating the operation thereof when the weight of the weighed object is below the operating range.

FIGS. 2A and 2B are similar schematic illustrations of the operation of the same scale and readout when the weight of the object is within the range.

FIGS. 3A and 3B are similar schematic illustrations showing the operation of the same scale and readout when the weight of the object is above the range.

FIG. 4 is a geometric diagram showing the balance of forces in the scale of this invention.

FIGS. 5A through 5E are a series of schematic diagrams showing the position of the single auxiliary weight of this scale for various weights of the weighed object.

FIG. 6 is a perspective view, with parts broken away and removed for clarity of illustration, of a preferred form of postal weight range scale mechanism in accordance with this invention.

FIG. 7 is a front elevational view, with parts broken away for clarity of illustration of the same scale.

FIG. 8 is a side elevational view, with parts broken away for clarity of illustration, of the same scale.

The same reference characters refer to the same elements throughout the several views of the drawings.

DETAILED DESCRIPTION OF THE PREFERRED EMBODIMENT

FIGS. 1 through 3 schematically illustrate the operation of a scale 100 in accordance with this invention. The scale includes a weighing beam 102 which is balanced on a fulcrum 104 and has a pin 106 from which an auxiliary weight 108 is suspended by means of a slot 144. A weighed object having a weight W exerts a downward force upon the beam 102 on the left side of the fulcrum 104, as shown by the arrow 110.

The scale 100 also includes a readout 112 enclosed within a housing 114 formed with three display windows 116, 18 and 120. Within the housing 112 are light pipes 122, 124 and 126 which are aligned with readout windows 116, 118 and 120 respectively. A prism 128 collects ambient light, represented by arrow 130, which is downwardly incident upon the upper face 132 thereof, and reflects that light toward the pipes 122 through 126 by means of an internally reflecting surface 134. A shutter 136 is mounted on the weighing beam 102 for movement therewith, and blocks all of the reflected light except that which can pass through a transparent window 138 formed in the shutter.

The scale 100 and readout 112 have three distinct operating conditions, corresponding to three possible weights of the weighed object relative to a predetermined postal range, for example more than one ounce but not more than two ounces. FIGS. 1A and 1B show the condition which results when the force exerted by the weighed object, represented by arrow 110, is due to a weight W which is less than or equal to one ounce. Under these circumstances the combined weight of the weighed object and the auxiliary weight 108 does not tip the beam 102 at all. Consequently the shutter 136 at the end of the beam 102 is not raised, and the transparent window 138 lines up with the lowermost light pipe 126 and lowermost readout window 120. Accordingly, window 120 is illuminated by a reflected light beam 140, while the other readout windows 116 and 118 remain dark.

FIGS. 2A and 2B show the condition of the scale and readout when the weight W is greater than 1 ounce and less than or equal to 2 ounces. For example, the weighed object may be a letter which falls within the 1 to 2 ounce postal range. Under these circumstances the force represented by arrow 110 plus that exerted by the auxiliary weight 108 is sufficient to tip the beam 102 about its fulcrum 104. But the beam tips only far enough for the auxiliary weight 108 to strike a supporting surface 142. The slot 144 is vertically elongated so as to form a vertical lost motion coupling to the pin 106 and beam 102. Accordingly, when the weight 108 strikes the surface 142, it is decoupled from the beam 102. Stated differently, the pin 106 rides downwardly in the elongated slot 144 to the extent necessary to relieve the beam 102 of at least some of the downward force exerted by the auxiliary weight 108. Once the beam is relieved of enough of that downward force so that the weight W plus the remaining force exerted by auxiliary weight 108 upon the beam is no longer sufficient to tip the beam, it tips no further and thus is arrested at the decoupling point.

As a result, the beam 102 tips only far enough to assume the position of FIG. 2A and the shutter 136 is raised by the beam 102 just far enough to line up the transparent window 138 with the middle light pipe 124 and middle readout window 118. Thus a light beam 146 reflected from the prism surface 134 illuminates the middle readout window 118, but not the upper and lower readout windows 120 and 116.

Finally, when the weighed object has a weight W which is greater than 2 ounces, the force represented by arrow 110 is sufficient by itself to tip the beam 102 as far as it is permitted to go, the pin 106 riding further down in the lost motion slot 144 as the beam passes the decoupling point. When this happens the shutter 136 is raised by the beam 102 so that the transparent window 138 thereof lines up with the uppermost light pipe 122 and a reflected light beam 148 illuminates the uppermost readout window 116 but not the lower two windows 118 and 120.

Summarizing the operation of the scale 100, it has but three operating conditions. The first condition, illustrated by FIGS. 1A and 1B, results from a weight W which is below the lower limit of the predetermined range, for example less than or equal to 1 ounce. The second condition, represented by FIGS. 2A and 2B, results from a weight W which is within the range, for example more than 1 ounce but not more than 2 ounces. The third condition, illustrated by FIGS. 3A and 3B, results from a weight W which is above the upper limit of the range, for example more than 2 ounces. For each of these operating conditions there is a different one of three discrete positions of the weighing beam 102 and the light gating shutter 136. In its first position the beam 102 is not tipped at all and the shutter 136 is not raised, so that only readout window 120 is illuminated. In its second position beam 102 is tipped just to the decoupling point and no further, and the shutter 136 is raised to a middle position, darkening window 120 and illuminating window 118 while window 116 remains dark. Finally, in its third position the beam 102 is fully tipped, raising shutter 136 to its highest position and illuminating the uppermost window 116 while darkening the two lower windows 118 and 120.

Thus the readout 112 can only assume one of three discrete indications: illumination of window 120 only, indicating a weight below the range; illumination of window 118 only, indicating a weight within the range; or illumination of window 116 only, indicating a weight above the range. Where postal rates are concerned, window 118 indicates that a given amount of postage is required, window 120 indicates that less postage will do, and window 116 indicates that more postage is required.

Correspondingly, the auxiliary weight 108 has but three discrete operating relationships to the beam 102. The weight 108 is entirely supported on the pin 106 of beam 102 if W is less than 1 ounce (FIG. 5A) or exactly 1 ounce (FIG. 5B), i.e. below the lower limit of the range. In the second relationship, as represented by FIG. 5C, the weight 108 rests partly on the pin 106 and partly on the support 142 when W is more than 1 and less than 2 ounces, or, as represented by FIG. 5D, it rests all of its weight upon the support 142 when W equals 2 ounces, although the beam 102 still has not tipped far enough to drive the pin 106 down the slot 144. The third condition, seen in FIG. 5E, results from a weight above the upper limit of the range, i.e. when W is more than 2 ounces, and the pin 106 is at least part way down the lost motion slot 144. The condition represented by FIGS. 5A and 5B is referred to as "suspension" of the auxiliary weight 108 upon the beam 102, while the two conditions represented by FIGS. 5C through 5E are both referred to as "decoupling" of the weight from the beam; the beam in FIGS. 5C and 5D remaining at the decoupling point while in FIG. 5E it is past the decoupling point.

In FIG. 4 is seen a diagrammatic summary of the forces acting upon the beam 102 in its various positions. At the pivot point an upward force represented by arrow 404 is exerted by the fulcrum 104. At the left side of the fulcrum the forces exerted are those of the weighed object, represented by arrow 110, and the auxiliary weight 108, represented by arrow 408. At the right side of the fulcrum there may be mounted a counterweight 150 which exerts a countervailing force represented by arrow 450, the position of the counterweight 150 along the length of the weighing beam 102 determining the particular weight range to which the scale 100 and its readout 112 are keyed. If the counterweight 150 is moved right or left along the beam 102, the weight range shifts up or down accordingly.

FIGS. 6 to 8 depict a preferred physical realization of the weight range scale 100, including the counterweight 150 which is slideable longitudinally of the weighing beam 102 as indicated by arrows 152. The counterweight 150 is provided with a projection 154, an edge 154.1 of which engages with any one of a series of notches 156 formed on the upper surface of the weighing beam 102. As a result, the counterweight can assume a succession of distinct spaced positions, each one of which shifts the operation of the scale 100 to a different postal range. For example, the first notch 156 at the left may correspond to the range from 0 to 1 ounce, the second notch to the range from 1 to 2 ounces, and so on.

At the far end of the weighing beam 102 FIG. 6 shows the readout shutter 136 which moves vertically with the beam, and the transparent window 138 which is formed in the shutter for light gating purposes. In this view the remaining elements of the illuminated readout 112 are removed for clarity of illustration.

The beam 102 is conventionally supported upon a subframe 158 by means of a fulcrum 104 which projects laterally from both sides of the weighing beam and has downwardly directed knife edges resting on a pair of M-shaped brackets 160 secured by means of an inverted U-shaped collar 159 to the subframe 158 at either side of the beam. The subframe 158 in turn is secured by means of a bolt 162 to a primary frame member 164 which includes a horizontal panel 166, vertical panels 168 and a floor panel 169 cooperating to form an enclosure for the scale mechanism.

The mail or other object to be weighed is placed upon an external receiving pan 170 against which it exerts the downward force represented by the arrow 110. This force in turn is transmitted through pan supporting elements 172 and a pan supporting frame 174 to a pair of W-shaped brackets 176 supported at either side of the beam 102 by a U-shaped member 173 secured to the pan frame 174. From brackets 176 the force 110 is transmitted to an upwardly pointing knife edge element 178 which in turn is cradled upon a curved arm of a force transmitting element 180 secured to the beam 102 by a bolt 182. By this conventional mechanism the force 110 is transmitted straight downwardly, without any horizontal component, to the weighing beam 102. Force transmitting element 180 also has another curved arm at its opposite end which serves to transmit the weight of the beam 102 to its fulcrum 104. In the center of the pan supporting frame 174 is a generally cylindrical weight 184 which is calculated to balance the beam 102.

To complete this portion of the discussion, which relates to the conventional mechanism for supporting the weighing beam 102 and making it tip in response to the force 110, there is a link 186 secured by means of a pin 188 and nut 190 to the lower end of the subframe 158, and similarly secured by means of a pin 192 and a nut 194 to the lower end of the pan supporting frame 174. The purpose of this connection between subframe 158 and pan supporting frame 174 is to guide the motion of the pan 170 and its supporting elements 172 and 174 in a perfectly vertical direction in response to the force exerted by the weighed object (arrow 110).

In accordance with a preferred embodiment of this invention, the single auxiliary weight 108 is at the same end of the weighing beam 102 as the pan 170, and is suspended by means of a pair of lateral projections 200 on either side thereof which are formed with downwardly pointing knife edges 200.1 resting upon the vertices of a pair of upwardly facing V-shaped notched supporting surfaces 202 formed in the weighing beam 102. Note that above the surfaces 202 the weighing beam 102 provides no obstruction to the upward movement of the auxiliary weight 108 and its lateral projections 200, thus allowing for the vertical lost motion which is essential to decoupling of the auxiliary weight 108 from the weighing beam 102. Note also that the downwardly pointing knife edges 200.1 and their engagement with the vertices of V-shaped notches 202 increase the accuracy of the scale by insuring that the auxiliary weight 108 hangs perfectly vertically from the weighing beam 102 when suspended therefrom, and that it is snatched cleanly therefrom and in a perfectly vertical direction upon decoupling.

To further promote the goal of a clean, perfectly vertical pickup, the supporting surface which snatches the auxiliary weight 108 from the beam 102 for decoupling purposes has a similar pair of upwardly facing V-shaped notches 204, the vertices of which engage the knife edges 200.1. These notches are formed on a catcher member 206 which at least partially supports the auxiliary weight 108 on those occasions when it is upwardly decoupled from the weighing beam 102. The catcher 206 preferably has an inverted U-shaped cross section as seen in FIG. 8, and is integrally formed at the end of a cantilevered element 208 which is secured to the frame 164 by the bolt 162.

The cantilever 208 is sufficiently rigid to maintain the auxiliary weight catcher surfaces 204 thereof at a predetermined height so that the end points of each postal weight range remain accurate during the light stresses of ordinary use. But is it necessary for the cantilever 208 to flex somewhat in response to a large force intentionally exerted thereon for the purpose of initial adjustment of the height of the weight catcher surfaces 204, in order to set the weight range end points at the factory. To accomplish this adjustment, a bolt 210 is threaded through a boss 212 formed on the underside of the catcher member 206, and is advanced upwardly to contact another boss 214 formed on the underside of the horizontal plate 166 of frame 164. The bolt 210 develops considerable mechanical advantage, and when it is tightened against the boss 214 it exerts a strong downward force upon the catcher member 206 to flex the cantilever support 208 and adjust the height of the catcher surfaces 204. The adjustment effected in this way is quite precise, because of the small vertical motion of the bolt 210 for a given amount of rotation thereof. In addition, because of the mechanical advantage no undue effort is required to effect the adjustment.

Once the height of the catcher surfaces 204 is set by means of the bolt 210, the precise decoupling position of the beam 102 is then determined, and this in turn fixes the end points of a particular weight range measured by the scale. Without in any way changing this decoupling position, the entire weight range can than be shifted a predetermined amount up or down by the operator during normal use by simply sliding the counterweight 150 longitudinally along the beam 102 until the edge 154.1 engages another of the notches 156 thereon.

A connecting element 220 spaces the frame 164 from the readout housing 114, while directly above the connecting element is a member 222 rotatably supported on shafts 224 and 226 which are journaled on the frame 164 and the housing 114 respectively. The member 222 has a number of surfaces, such as surface 228, each of which has a printed postage guide applicable to a different postal category, e.g. first class mail, parcel post, etc. A thumb wheel 230 is secured to the shaft 226 within the housing 114, and protrudes forwardly through an aperture 232 in the front wall of the housing so that the operator can readily rotate the guide member 222 by means of the thumb wheel to select a different mail category.

After selecting the proper category, the user places the piece of mail to be weighed on the pan 170 and slides the counterweight 150 to a position which corresponds to the estimated weight of the piece of mail. If the weight turns out to be below the estimated range, the lowermost readout window 120 will be illuminated. The operator then slides the counterweight 150 to the right, one notch at a time, each time checking to see whether the middle readout window 118 is illuminated. When it is, then the piece of mail is known to be within the postal weight range indicated by the current position of the counterweight 150, and postage is applied accordingly.

If the first attempt at placing counterweight 158 results in illumination of the window 116, then the piece of mail is above the estimated weight range. In that case the same procedure is followed, except that the counterweight 150 is moved to the left until illumination of the readout window 118 is achieved.

It will now be appreciated that merely by sliding the counterweight the operator can select from among a large plurality of weight ranges even though the scale has but a single auxiliary weight. This single weight is located on the same side of the fulcrum as the weighing pan, and it is uncoupled from the weighing beam in contrast to prior art devices in which auxiliary weights are picked up successively by the weighing beam on the opposite side of the fulcrum, and a separate such weight is required for each range over which the scale operates.

Since the foregoing description and drawings are merely illustrative, the scope of protection of the invention has been more broadly stated in the following claims; and these should be liberally interpreted so as to obtain the benefit of all equivalents to which the invention is fairly entitled.

We claim:

1. A scale for classifying letters or other objects relative to a postal or other weight range, comprising:
   a weighing beam;
   means of said beam for accepting a weighed object;
   means pivoting said beam to tip in response to weight thereon;
   a single auxiliary weight;
   means for suspending said auxiliary weight from said beam on the same side of the pivot point thereof as said object-accepting means whereby said auxiliary weight initially assists said weighed object in tipping said beam;
   said suspending means interconnecting said beam and said auxiliary weight for a range of upward lost motion of said auxiliary weight relative to beam, and for lifting of said auxiliary weight by said beam at one end of said lost motion range;
   means for supporting said auxiliary weight on occasions when said beam is tipped to a predetermined extent; and
   said scale being arranged so that said beam assumes a first position in which it suspends said auxiliary weight off said occasional supporting means when the weight of said weighed object is less than the lower limit of said range, assumes a second position in which it is tipped far enough to rest said weight upon said occasional supporting means to the extent necessary to decouple said weight from said beam in a manner to prevent further tipping of said beam when said object weight is within said weight range, and assumes a third position in which it is tipped beyond the decoupling point only when said object weight exceeds the upper limit of said weight range.

2. A scale as in claim 1 in which said weight range is selectable by the operator from a plurality of weight ranges, said scale further comprising:
   a counterweight mounted on said beam for adjustment longitudinally thereof; and
   a means for defining a plurality of spaced, discrete positions of adjustment for said counterweight relative to said beam, each of which shifts said three beam positions to a different one of the available weight ranges.

3. A scale as in claim 1 further comprising a readout operable by said beam to three discrete indicating conditions corresponding respectively to said three beam positions.

4. A scale as in claim 1, further comprising: means for vertically adjusting the position of said auxiliary weight occasional supporting means whereby to select the degree of beam tipping at which said decoupling occurs.

5. A scale as in claim 1 wherein:
   said pivoting means comprises a frame and a fulcrum pivotally supporting said beam on said frame;
   said auxiliary weight comprises lateral projections on either side thereof;
   said suspending means comprises upwardly facing surfaces on said beam extending underneath said lateral projections whereby to suspend said auxiliary weight therefrom when said beam is in said first position, and vacant lost motion spaces above said upwardly facing surfaces into which said auxiliary weight and said lateral projections thereof are able to move upwardly for decoupling from said beam; and
   said occasional supporting means is secured to said frame and includes upwardly facing surfaces extending underneath said lateral projections at a height to engage therewith and decouple said auxiliary weight from said beam when it tips to said second position.

6. A scale as in claim 5 wherein:
   said lateral projections comprise downwardly pointing knife edges for engaging said upwardly facing surfaces; and
   said upwardly facing surfaces comprise upwardly opening V-shaped notches the vertices of which engage said lateral projection knife edges.

7. A scale as in claim 5 further comprising: means for vertically adjusting the position of said occasional supporting means relative to said frame, whereby to select the degree of beam tipping at which said decoupling occurs.

8. A scale as in claim 7 further comprising:
   a cantilever secured to said frame and having one end extending freely therefrom; and said occasional supporting means being secured to the free end of said cantilever whereby to move vertically relative to said frame for said decoupling adjustment.

9. A scale as in claim 8 wherein said decoupling adjustment means comprises: means for adjustably spacing said cantilever free end from said frame.

10. A scale as in claim 9 wherein: said adjustable spacing means is secured to a first one of the adjustably spaceable elements and is adjustably extendible toward the other of said adjustably spaceable elements.

11. A scale as in claim 10 wherein: said adjustably extendible element is a bolt threaded to said one element and threadable vertically against said other element for adjustment purposes.